US012734379B2

(12) United States Patent
Park et al.

(10) Patent No.: US 12,734,379 B2
(45) Date of Patent: Sep. 15, 2026

(54) VEHICLE, VEHICLE CONTROL APPARATUS, AND VEHICLE FIRE SUPPRESSING APPARATUS

(71) Applicant: HYUNDAI MOBIS CO., LTD., Seoul (KR)

(72) Inventors: Jong Chan Park, Yongin-si (KR); Hee Kyung Kang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 408 days.

(21) Appl. No.: 18/105,508

(22) Filed: Feb. 3, 2023

(65) Prior Publication Data

US 2023/0241432 A1 Aug. 3, 2023

(30) Foreign Application Priority Data

Feb. 3, 2022 (KR) ........................ 10-2022-0014137
Feb. 3, 2022 (KR) ........................ 10-2022-0014138
Feb. 3, 2022 (KR) ........................ 10-2022-0014234

(51) Int. Cl.
*A62C 3/07* (2006.01)
*A62C 3/16* (2006.01)

(52) U.S. Cl.
CPC . *A62C 3/07* (2013.01); *A62C 3/16* (2013.01)

(58) Field of Classification Search
CPC ......... A62C 3/07; A62C 3/16; A62C 99/0072; A72C 37/04; A72C 37/10; A72C 37/40; B60L 58/10; B60L 58/26; B60L 3/0046; B60L 3/12
See application file for complete search history.

(56) References Cited

U.S. PATENT DOCUMENTS

| | | | | |
|---|---|---|---|---|
| 2009/0205846 A1* | 8/2009 | Zeweke | .................... | A62C 3/07 169/45 |
| 2018/0289996 A1* | 10/2018 | Kim | ........................ | A62C 37/04 |

FOREIGN PATENT DOCUMENTS

| | | | | | |
|---|---|---|---|---|---|
| EP | 3188304 | * | 5/2017 | ............ | H01M 10/63 |
| JP | 2018-523893 | A | 8/2018 | | |
| JP | 2020-520322 | A | 7/2020 | | |
| KR | 20120069334 | * | 6/2012 | .......... | H01M 50/572 |
| KR | 10-2017-0103170 | A | 9/2017 | | |
| KR | 10-2018-0113795 | A | 10/2018 | | |
| KR | 10-2019-0127219 | A | 11/2019 | | |
| KR | 10-2021-0008543 | A | 1/2021 | | |
| KR | 10-2022-0008986 | A | 1/2022 | | |
| WO | 2021146763 | A1 | 7/2021 | | |

OTHER PUBLICATIONS

Notice of Allowance dated Feb. 23, 2026 issued in the corresponding Korean Patent Application No. 10-2022-0014137.

(Continued)

*Primary Examiner* — Christopher R Dandridge
(74) *Attorney, Agent, or Firm* — MORGAN, LEWIS & BOCKIUS LLP

(57) ABSTRACT

Disclosed is a vehicle includes a vehicle body, a battery provided in an interior of the vehicle body, and a first channel connecting the vehicle body and the battery and having a passage, a port that is provided to be opened and closed is formed in the vehicle body, and the first channel connects the battery and the port.

7 Claims, 17 Drawing Sheets

(56) References Cited

OTHER PUBLICATIONS

Office Action issued in corresponding Korean Patent Application No. 10-2022-0014138 dated Jun. 9, 2026, with English translation.

Office Action issued in corresponding Korean Patent Application No. 10-2022-0014234 dated Jun. 9, 2026, with English translation.

* cited by examiner

VEHICLE, VEHICLE CONTROL APPARATUS, AND VEHICLE FIRE SUPPRESSING APPARATUS

CROSS-REFERENCE TO RELATED APPLICATION

This application claims the benefit of priority to Korean Patent Application Nos. 10-2022-0014234, 10-2022-0014137, and 10-2022-0014138, filed in the Korean Intellectual Property Office on Feb. 3, 2022, the entire contents of which are incorporated herein by reference.

TECHNICAL FIELD

The present disclosure relates to a vehicle, a vehicle control apparatus, and a vehicle fire suppressing apparatus, and more particularly, relates to a vehicle provided with a battery, a vehicle control apparatus, a vehicle control method, and a vehicle fire suppressing apparatus.

BACKGROUND

In an electric vehicle, a battery of a high capacity for providing driving power is mounted. As an example of the battery, a lithium ion battery is particularly spotlighted.

In a battery mounted on an electric vehicle, including a lithium ion battery, it is necessary to secure a sealing performance from an outside to secure safety. Accordingly, it is general to employ a structure that may secure sealing performance in a battery according to a conventional technology.

Meanwhile, when a fire occurs in a process of driving and charging an electric vehicle, it is necessary to extinguish a fire in a short time to secure safety of passengers. However, as described above, according to the conventional technology, it is difficult to promptly extinguish a fire of a battery due to a sealing performance of the battery. That is, according to the conventional technology, the sealing performance of the battery is applied as a factor that hinders safety against a fire of an electric vehicle.

SUMMARY

The present disclosure has been made to solve the above-mentioned problems occurring in the prior art while advantages achieved by the prior art are maintained intact.

An aspect of the present disclosure is to enhance safety of an electric vehicle by promptly extinguishing a fire when the fire occurs in an electric vehicle due to a battery.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle includes a vehicle body, a battery provided in an interior of the vehicle body, and a first channel connecting the vehicle body and the battery and having a passage, a port that is provide to be opened and closed is formed in the vehicle body, and the first channel connects the battery and the port.

The battery may further include a battery valve connected to the first channel and provided to be opened and closed.

The battery valve may be provided on an upper surface of a case of the battery.

The port may be provided in a trunk of the vehicle body.

The battery may be provided in a front area or a middle area of the vehicle body.

The vehicle may further include a cooled part cooled by a cooling fluid, and a second channel connecting the cooled part and the battery and having a passage, through which the cooling fluid flows.

The second channel may be provided on an upper surface of a case of the battery.

The battery may further include a gas discharge valve provided on one side of a case of the battery and provide to be opened and closed, and the gas discharge valve may be provided on an upper surface of the case of the battery.

The battery valve may be provided in a rear area of the upper surface of the case of the battery, and the gas discharge valve may be provided on an upper surface of the case of the battery.

According to another aspect of the present disclosure, a vehicle fire suppressing apparatus includes a housing including a movement part at a lower portion thereof, and including a fire extinguishing medium in an interior thereof, a nozzle part provided in the housing to be movable in an upward/downward direction, and that ejects the fire extinguishing medium to an outside, and a controller that performs a control to move the housing to a lower side of a vehicle, in which a fire occurs, and that causes the nozzle part to pass through a lower portion of the vehicle based on a height of the lower side of the vehicle and controls the fire extinguishing medium to be ejected.

The housing may further include a supply pipe that receives the fire extinguishing medium from an outside.

The nozzle part may include a nozzle member having a passage, in which the fire extinguishing medium is transported, and a head part installed to be connected to an upper portion of the nozzle member, and through which the fire extinguishing medium transported to the passage is introduced to be ejected to an outside through a plurality of ejection holes.

The head part may have a shape that is inclined toward an upper side.

According to another aspect of the present disclosure, a vehicle control apparatus includes a switching valve provided between a first cooling circulation passage, in which a first cooling fluid circulates, and a third cooling circulation passage passing via a battery, a path valve provided between a second cooling circulation passage, in which a second cooling fluid circulates, and a third cooling circulation passage, and a controller that performs a control to supply the first cooling fluid to the third circulation passage by driving the switching valve or that performs a control to supply the second cooling fluid to the third cooling circulation passage by driving the path valve.

The third cooling circulation passage may pass through a battery case that surrounds a battery module.

The controller may drives the switching valve to stop supply of the first cooling fluid to the first cooling circulation passage and supply the first cooling fluid to the third cooling circulation passage when a fire occurs in the battery.

The controller may drive the path valve to stop supply of the second cooling fluid to the second cooling circulation passage and supply the second cooling fluid to the third cooling circulation passage when the fire of the battery continues after the first cooling fluid is supplied to the third cooling circulation passage.

According to another aspect of the present disclosure, a vehicle control method includes performing a control to supply a first cooling fluid to a third cooling circulation passage that passes via a battery by driving a switching valve provided between a first cooling circulation passage, in which the first cooling fluid circulates, and the third cooling circulation passage, and performing a control to supply a second cooling fluid to the third cooling circulation passage by driving a path valve provided between a second cooling circulation passage, in which the second cooling fluid circulates, and the third cooling circulation passage.

The vehicle control method may further include driving the switching valve to stop supply of the first cooling fluid to the first cooling circulation passage and supply the first cooling fluid to the third cooling circulation passage when a fire occurs in the battery.

The vehicle control method may further include driving the path valve to stop supply of the second cooling fluid to the second cooling circulation passage and supply the second cooling fluid to the third cooling circulation passage when the fire of the battery continues after the first cooling fluid is supplied to the third cooling circulation passage.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, a vehicle and a vehicle control method according to the present disclosure will be described with reference to the drawings.

Vehicle

Figure 1:
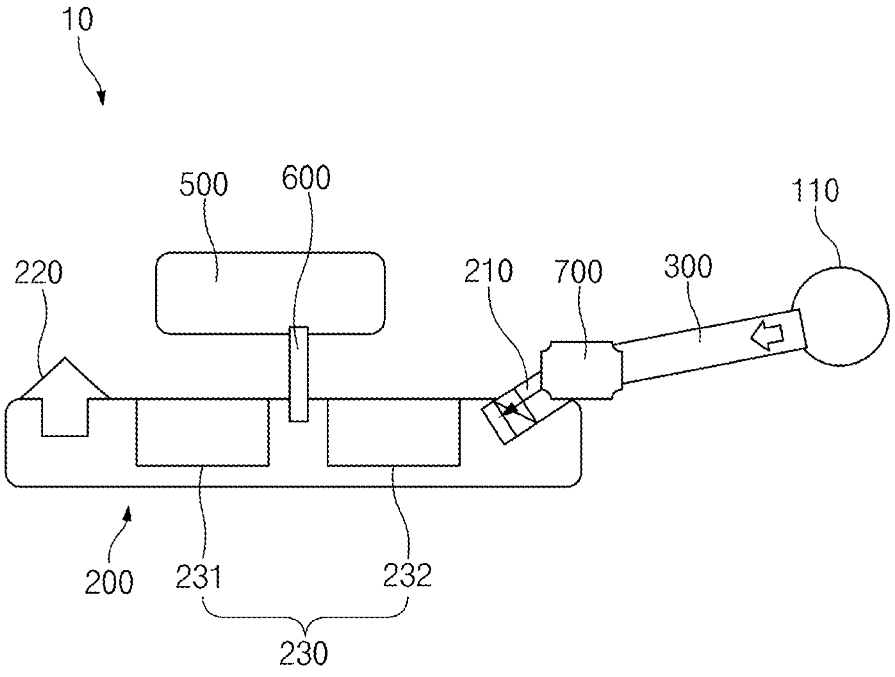
FIG. 1 is a view illustrating a battery and peripheral configurations mounted on a vehicle according to the present disclosure.
Figure 2:
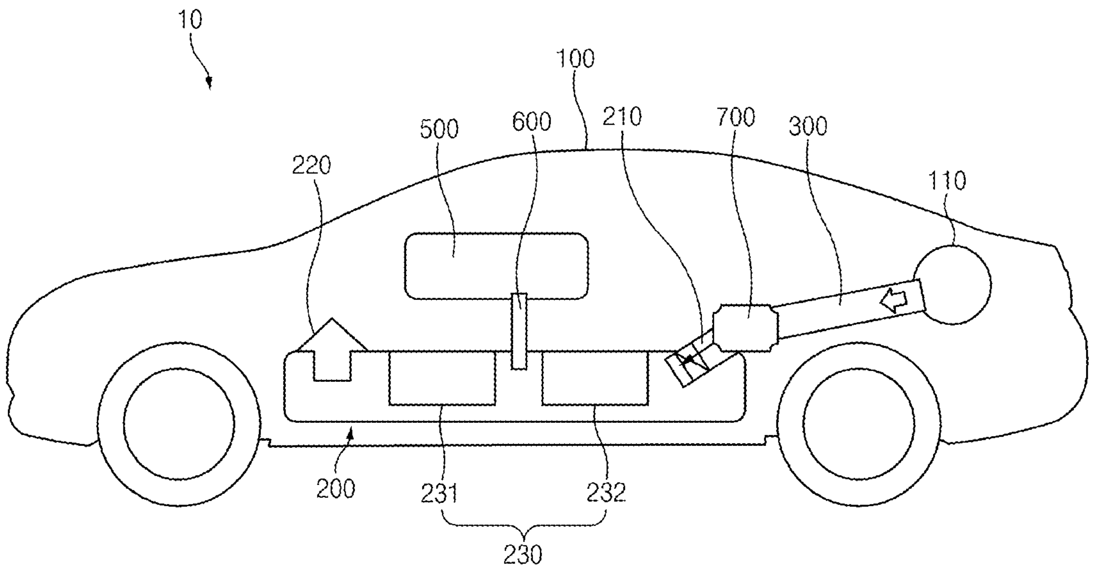
FIG. 2 is a view illustrating a vehicle according to the present disclosure.

FIG. 1 is a view illustrating a battery and peripheral configurations mounted on a vehicle according to the present disclosure. FIG. 2 is a view illustrating a vehicle according to the present disclosure.

Referring to the drawings, a vehicle 10 according to the present disclosure may include a vehicle body 100, a battery 200 that is provided in an interior of the vehicle body 100, and a first channel 300 that connects the vehicle body 100 and the battery 200 and has a passage. As will be described below, the first channel 30 may a configuration that provides a path, in which a fire distinguishing fluid is supplied from an outside to the battery 200 when a fire occurs in the battery 200.

Meanwhile, in the specification, the battery 200 is a concept including a battery module and a battery pack as well as individual batteries, such as a pouch type battery, a polygonal battery, and the like.

Meanwhile, a port 110 that is provided to be opened and closed may be formed in the vehicle body 100. Then, according to the present disclosure, the first channel 300 may be configured to connect the battery 200 and the port 110. Accordingly, according to the present disclosure, as the port 110 is normally maintained in a closed state and the first channel 300 is maintained in a closed state from an outside and the port 110 is opened when a fire occurs in the battery 200, a fire extinguishing fluid may be introduced into the battery 200 through the first channel 300.

Referring to the drawings again, the battery 200 may further include a battery valve 210 that is connected to the first channel 300 and is provided to be opened and closed. The battery valve 210 may be a configuration for adjusting introduction of the fire extinguishing fluid introduced through the first channel 300. Similarly to the port 110, the battery valve 210 also may be maintained in a closed state normally. Then, when a fire occurs in the battery 200, it may be opened.

The above-described battery valve 210 may be provided on an upper surface of a case of the battery 200. In this case, because the fire extinguishing fluid introduced into the battery 200 is not discharged to the outside and consistently stays in an interior of the battery 200, a fire may be promptly extinguished. As an example, the battery valve 210 may be a check valve that allows a fluid to flow only in one direction.

Referring to FIG. 2 again, the battery 200 provided in the vehicle 10 may be provided in a front area or a middle area of the vehicle body 100, and the port 10 provided in the vehicle body 100 may be provided in a rear area of the vehicle body 100. In this case, the port 110 and the battery 200 may be spaced apart from each other in a forward/rearward direction of the vehicle 10. Accordingly, according to the present disclosure, the fire extinguishing fluid may be stably introduced into the first channel 300 through the port 110 that is spaced apart from the battery 200 even when a fire occurs in the battery 200. As an example, the port 110 may be provided in a trunk of the vehicle body 100 provided in the vehicle 10.

Meanwhile, the vehicle 10 according to the present disclosure may further include a cooled part 500 that is cooled by the cooling fluid, and a second channel 600 that connects the cooled part 500 and the battery 200 and has a passage, in which the cooling fluid flows. The above-described cooled part 500 is a configuration provided in the vehicle 10, and the present disclosure is not limited as long as it is a configuration that requires cooling by the cooling fluid. As an example, the cooled part 500 may be a motor or an inverter, and may be the battery 200 itself.

Meanwhile, the second channel 600 may be provided on an upper surface of the case of the battery 200. Accordingly, because the fire extinguishing fluid introduced into the battery 200 through the second channel 600 is not discharged to the outside and consistently stays in an interior of the battery 200, a fire may be promptly extinguished.

Referring to the drawings again, the battery 200 may further include a gas discharge valve 220 that is provided on one side of the case of the battery 200 and is provided to be opened and closed.

The gas discharge valve 220 may be a configuration for decreasing an internal pressure of the battery 200 by discharging a gas that is present in the interior of the battery 200 to the outside when a fire occurs in the battery 200. In this case, a possibility of exploding g the battery 200 may become lower, and the fire extinguishing fluid or the cooling fluid may be smoothly introduced into the interior of the battery 20 through the first channel 300 or the second channel 600 as well. However, normally, the gas discharge valve 220 may be maintained in a closed state to secure a sealing performance of the battery 200.

The gas discharge valve 220 may be provided on an upper surface of the case of the battery 200. Accordingly, the cooling fluid or the fire extinguishing fluid introduced into the battery 200 may be prevented from being discharged to the outside through the gas discharge valve 220.

As an example, as illustrated in the drawings, the battery valve 210 may be provided in a rear area of the upper surface of the case of the battery 200, and the gas discharge valve 220 may be provided in a front area of the upper surface of the case of the battery 200. In this case, because the battery valve 210 and the gas discharge valve 220 are spaced apart from each other in a forward/rearward direction, an area, in which the gas in the interior of the battery 200 is discharged, and an area, in which the fire extinguishing fluid is introduced into the interior of the battery 200, may be separated from each other when a fire occurs in the battery 200 whereby a process of discharging the gas and a process of introducing the fire extinguishing fluid may separately performed smoothly.

Furthermore, according to the present disclosure, the battery 200 may further include a sensor member 230 that detects smoke or flames. In more detail, the sensor member 230 may include a first sensor member 231 that detects smoke and a second sensor member 232 that detects flames.

Furthermore, according to the present disclosure, the vehicle 10 may further include a connector member 700 that connects the battery valve 210 and the first channel 300.

Method for Controlling Vehicle

Hereinafter, a method for controlling a vehicle according to the present disclosure will be described with reference to above-described contents and the drawings.

The method for controlling a vehicle according to the present disclosure may be a method for controlling the vehicle, on which the battery 200 is mounted.

In more detail, the method for controlling the vehicle may include an operation of detecting a fire in the battery 200, an operation stopping operation of stopping an operation of the battery 200, a cooling fluid injecting operation of injecting the cooling fluid provided in the vehicle 10 into the battery 200, and a fire extinguishing operation of injecting the fire extinguishing fluid into the battery 200 from an outside of the vehicle 10.

According to the present disclosure, a fire of the battery 200 may be effectively coped with by introducing the cooling fluid that is present in the vehicle 10 and the external fire extinguishing fluid into the battery 200 together when the fire occurs in the battery 200.

The cooling fluid injecting operation and the fire extinguishing fluid injecting operation, which have been described above, may be a time sequential relationship. That is, the cooling fluid injecting operation may be performed prior to the fire extinguishing fluid injecting operation. However, unlike the above description, the cooling fluid injecting operation and the fire extinguishing fluid injecting operation may at least partially overlap each other time sequentially.

Meanwhile, the above-described detection operation may include detecting smoke in the battery 200 and detecting flames in the battery 200. As an example, the detecting of smoke may be performed before the detecting of flames time sequentially.

Furthermore, the method for controlling the vehicle according to the present disclosure may further include an alarm generating operation of generating an alarm, which is performed after the detection operation. As an example, the alarm generating operation may be performed after the smoke in the battery 200 is detected. The above-described alarm may be made through an acoustic means or a visual means (for example, a lamp or a display).

Meanwhile, the above-described fire extinguishing fluid injecting operation may be performed in a rear area of the battery 200, and a gas discharging operation may be formed in a front area of the battery 200. As described above, the battery valve 210 may be provided in the rear area of the upper surface of the case of the battery 200, and the gas discharge valve 220 may be provided in the front area of the upper surface of the case of the battery 200.

Vehicle Fire Suppressing Apparatus

Figure 3:
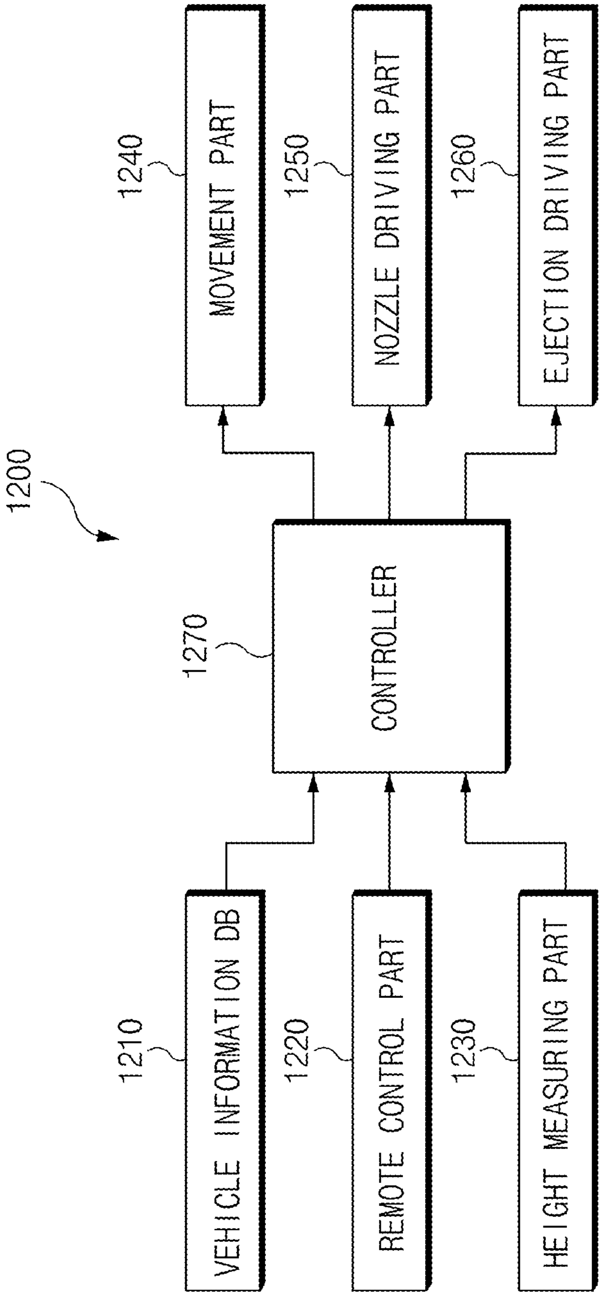
FIG. 3 is a block diagram illustrating a fire suppressing apparatus according to an embodiment of the present disclosure.
Figure 4:
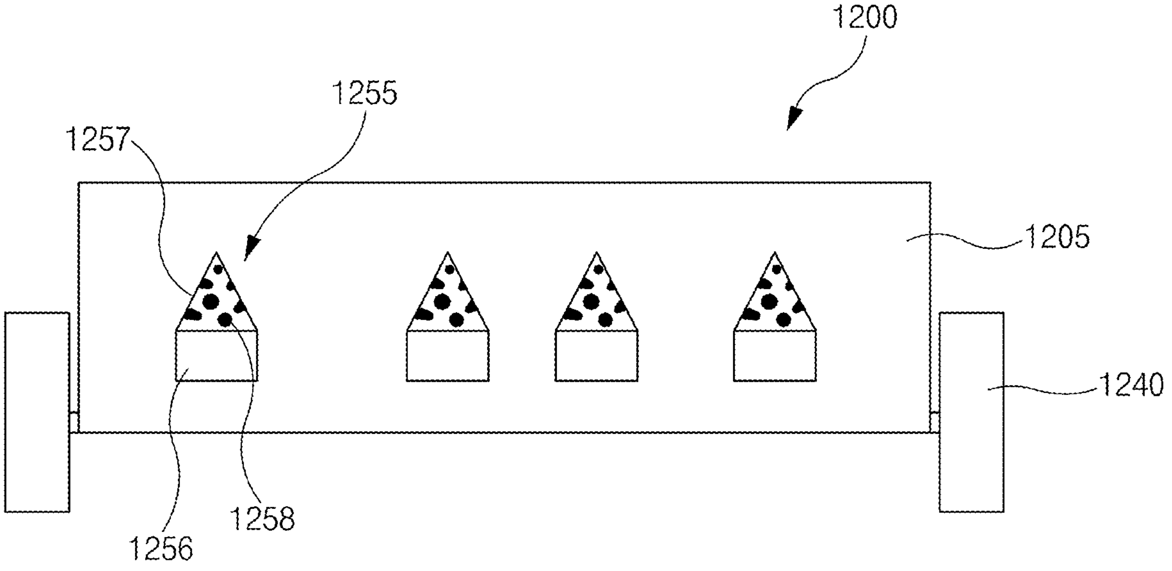
FIGS. 4 to 7 are views illustrating an operation of a fire suppressing apparatus according to an embodiment of the present disclosure.

FIG. 3 is a block diagram illustrating a fire suppressing apparatus according to an embodiment of the present disclosure. FIGS. 4 to 7 are views illustrating an operation of the fire suppressing apparatus according to an embodiment of the present disclosure. The fire suppressing apparatus according to the present disclosure may be applied to the vehicle, on which the battery is mounted. As an example, the above-described vehicle may be an electric vehicle.

Referring to FIGS. 3 to 7, the vehicle fire suppressing apparatus 1200 according to an embodiment of the present disclosure may include a housing 1205 that has a nozzle part 1255 on an upper side thereof, and a movement part 1240 for movement or the housing 1205 in a forward and rearward direction and rotation of the housing 1205 in a leftward/rightward direction on a lower side of the housing 1205.

The housing 1205 may be filled with a fire extinguishing medium (not illustrated), such as fire extinguishing powder or a fire extinguishing liquid, in an interior thereof. The housing 1205 may further include a supply pipe 1271 that may be connected to a fire truck or a fireplug to receive the fire extinguishing medium.

Figure 5:
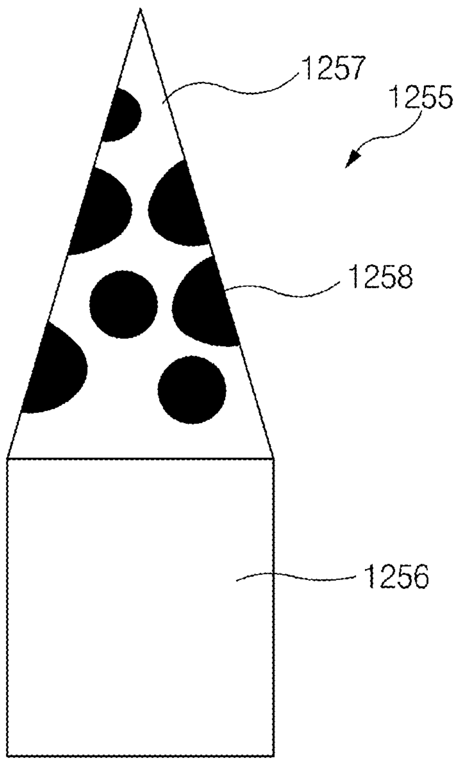
Figure 6:
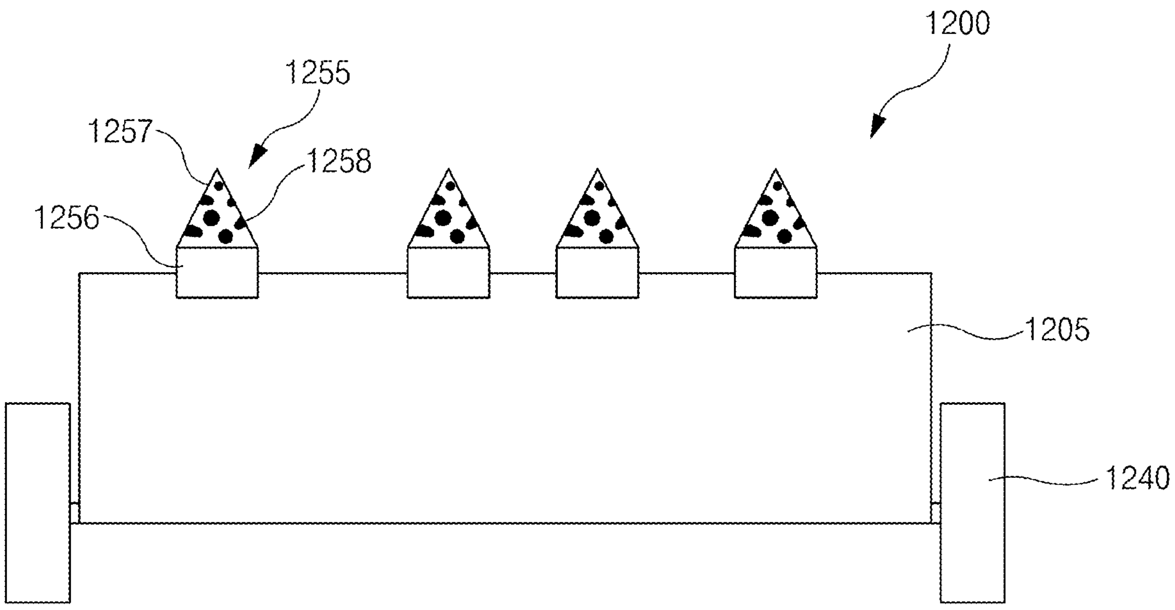
Figure 7:
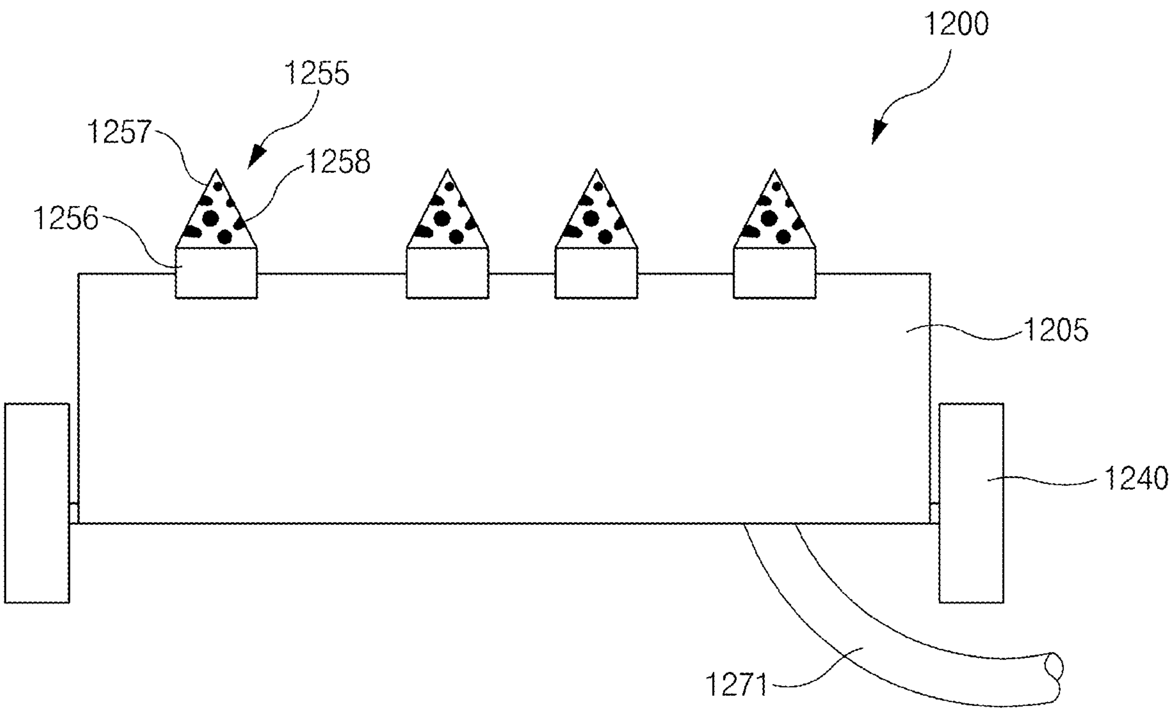

Referring to FIG. 5, the nozzle part 1255 is configured to reciprocate to an interior and an upper side of the housing 1205 and is configured to discharge the fire extinguishing medium filled in the housing 1205 toward an ignition point.

The housing 1205 may further include a nozzle driving part 1250 that provides driving power, such as a hydraulic pressure, such that the nozzle part 1255 reciprocates in an upward/downward direction. For example, the nozzle driving part 1250 may include a cylinder (not illustrated) provided with a piston (not illustrated).

The nozzle part 1255 may include a nozzle member 1256 and a head part 1257.

The nozzle member 1256 has a passage, in which the fire extinguishing medium filled in the housing 1205 is transported.

The head part 1257 is connected to an upper portion of the nozzle member 1256, and the fire extinguishing medium transported to the passage of the nozzle member 1256 is introduced and is ejected to an outside through a plurality of ejection holes 1258. The head part 1257 has a shape that is tapered toward an upper side, and has a shape that is sharp toward the upper side. The ejection holes 1258 may be formed at an inclined circumference on a side surface of the head part 1257 at a specific interval.

The housing 1205 may further include an ejection driving part 1260 that provides driving power, such as a hydraulic pressure, such that the fire extinguishing medium is ejected to the outside from the ejection holes 1258.

The movement part 1240 may have a plurality of wheels that are driven by a motor and the like or a caterpillar.

The controller 1270 may control overall operations of the fire suppressing apparatus 1200. For example, the controller 1270 may include a microcontroller unit (MCU).

The controller 1270 may perform a control to move the housing 1205 in the forward/rearward direction and rotate the housing 1205 in the leftward/rightward direction by driving the movement part 1240, perform a control to reciprocate the nozzle part 1255 in an upward/downward direction by driving the nozzle driving part 1250, and perform a control to eject the fire extinguishing medium to the outside from the ejection hole 1258 by driving the ejection driving part 1260.

The controller 1270 may receive lower heights for kinds of vehicles from a vehicle information DB 1210 based on a structure of batteries for the kinds of the vehicles. The controller 1270 may adjust a length, by which the nozzle part 1255 protrudes to an upper side, by controlling the nozzle driving part 1250 based on the information of the lower height of the vehicle, which is provided from the vehicle information DB 1210.

The controller 1270 may measure the lower height of the vehicle through a height measuring part 1230. For example, the height measuring part 1230 may include a distance measuring sensor, such as an ultrasonic sensor or a laser sensor. The controller 1270 may adjust a length, by which the nozzle part 1255 protrudes to an upper side, by controlling the nozzle driving part 1250 based on the information of the lower height of the vehicle, which is measured through the height measuring part 1230.

The controller 1270 is adapted to receive a control command with wireless communication through a remote control part 1220, and may control the fire suppressing apparatus 1200 with remove communication (wireless) based on a user terminal (not illustrated), such as a smartphone or a smart pad, which has a wireless communication function and may process data calculations.

The remote control part 1220 may include a camera (not illustrated) that captures an image of a front side of the housing 1205 and delivers the image to a user such that the fire suppressing apparatus 1200 may be controlled wirelessly at a remote site, a heat image camera (not illustrated) that detects a temperature of a periphery of the fire suppressing apparatus 1200 and delivers an ignition point to the user, and a headlight for securing a field of view of a front side, for example, in a case of nighttime movement.

Moreover, the controller 1270 may control at least another component (e.g., a hardware or software component) of the fire suppressing apparatus 1200, and may perform various data processing or calculations.

According to an embodiment, as at least a part of data processing or calculations, the controller 1270 may store a command or data received from another element (e.g., a sensor) in a volatile memory, may process the command or data stored in the volatile memory, and may store result data in the nonvolatile memory.

According to an embodiment, the controller 1270 may include a main processor (e.g., a central processing device or an application processor), and an auxiliary processor (e.g., a graphic processing device, an image signal processor, a sensor hub processor, or a communication processor) which may be operated independently from or together with the main processor. For example, when the controller 1270 includes a main processor and an auxiliary processor, the auxiliary processor may be configured to use lower electric power than the main processor or to be specified to a specific function. The auxiliary processor may be implemented separately from the main processor or as a part thereof.

In addition, although not illustrated in the drawings, according to the embodiments, the fire suppressing apparatus 1200 may include a storage.

The storage may store instructions that control the fire suppressing apparatus, control instruction codes, control data, or user data. For example, the storage may include at least one of an application program, an operating system (OS), middleware, or a device driver. The storage may include one or more of a volatile memory or a nonvolatile memory.

The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), and a ferroelectric RAM (FeRAM). The nonvolatile memory may include a read only memory (ROM), a programmable ROM (PROM), an electrically programmable ROM (EPROM), an electrically erasable programmable ROM (EEPROM), and a flash memory.

The storage may further include a nonvolatile medium, such as a hard disk drive (HDD), a solid state disk (SSD), an embedded multimedia card (eMMC), and a universal flash storage (UFS).

Figure 8:
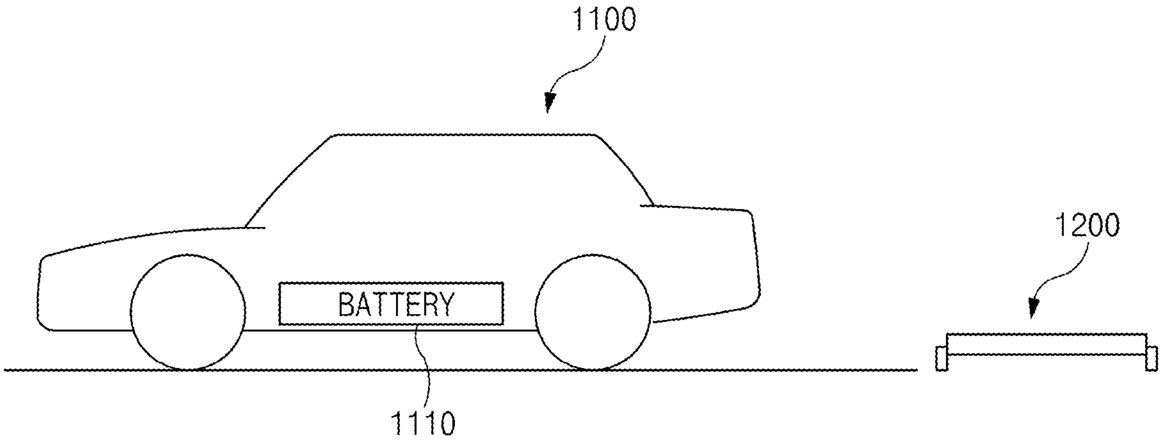
FIGS. 8 to 10 are views illustrating an example of use of a fire suppressing apparatus according to an embodiment of the present disclosure.
Figure 9:
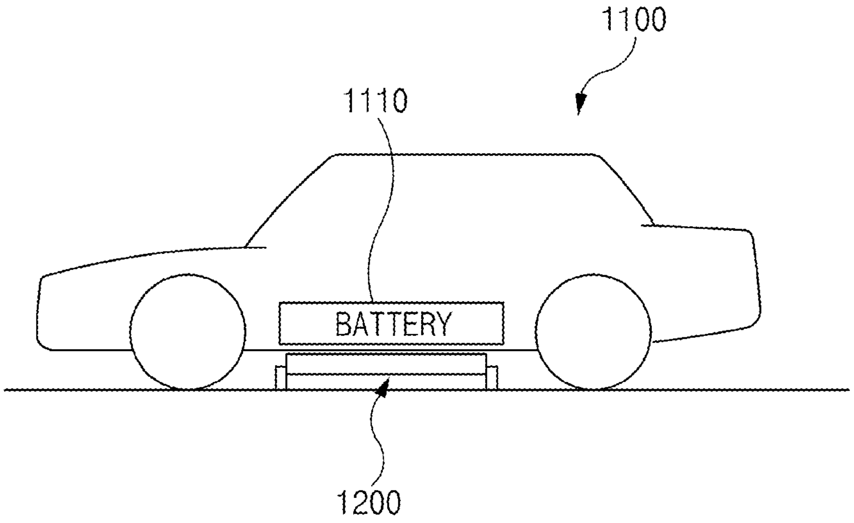
Figure 10:
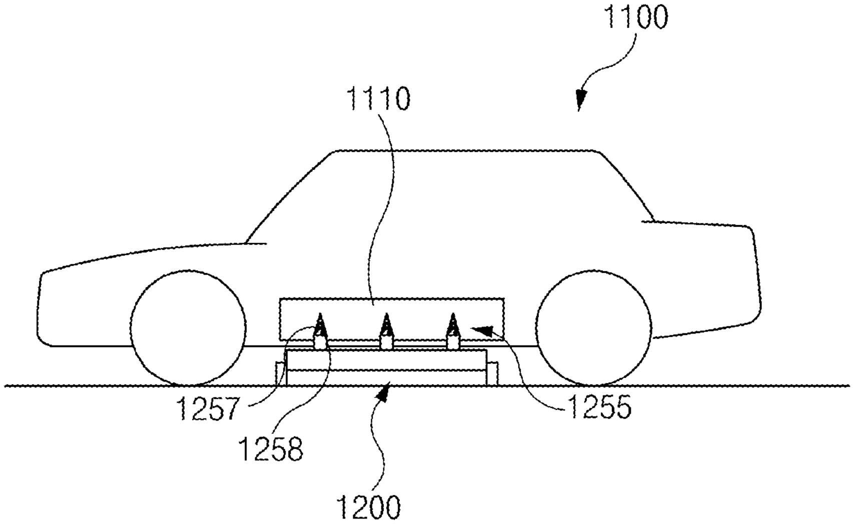

FIGS. 8 to 10 are views illustrating an example of use of the fire suppressing apparatus according to an embodiment of the present disclosure.

Referring to FIGS. 8 to 10, the fire suppressing apparatus 1200 according to an embodiment of the present disclosure has a structure that may enter a lower side of an electric vehicle, in which a fire occurs, and may be disposed at a site, at which a road parking lot or an electric vehicle is located, to be moved to the lower side of the electric vehicle, on which a fire occurs, in a remote control.

The fire suppressing apparatus 1200 according to the present disclosure may be operated not by a general person but by a fireman equipped with a safety measure or a similar person.

Referring to FIG. 9, when a fire occurs in a battery 1110 of the electric vehicle 1100, in which the battery 1110 is disposed on a lower side of the vehicle and the fire suppressing apparatus 1200 is moved to the lower side of the electric vehicle 1100, the controller 1270 may calculate the lower height of the vehicle through the vehicle information DB 1210 or the height measuring part 1230 and may calculate a distance, by which the nozzle part 1255 is moved to an upper side, based on the lower height of the vehicle.

Subsequently, referring to FIG. 10, the controller 1270 may cause a sharp portion of the head part 1257 to pass through a lower side of the vehicle and the battery 1110 by driving the nozzle driving part 1250 such that the nozzle part 1255 protrudes to an upper side. Subsequently, the controller 1270 may suppress a fire that occurs in the battery 1110 by driving the ejection driving part 1260 such that the fire extinguishing medium is ejected from the ejection holes 1258.

Hereinafter, a fire suppressing method according to another embodiment of the present disclosure will be described in detail with reference to FIG. 11.

Figure 11:
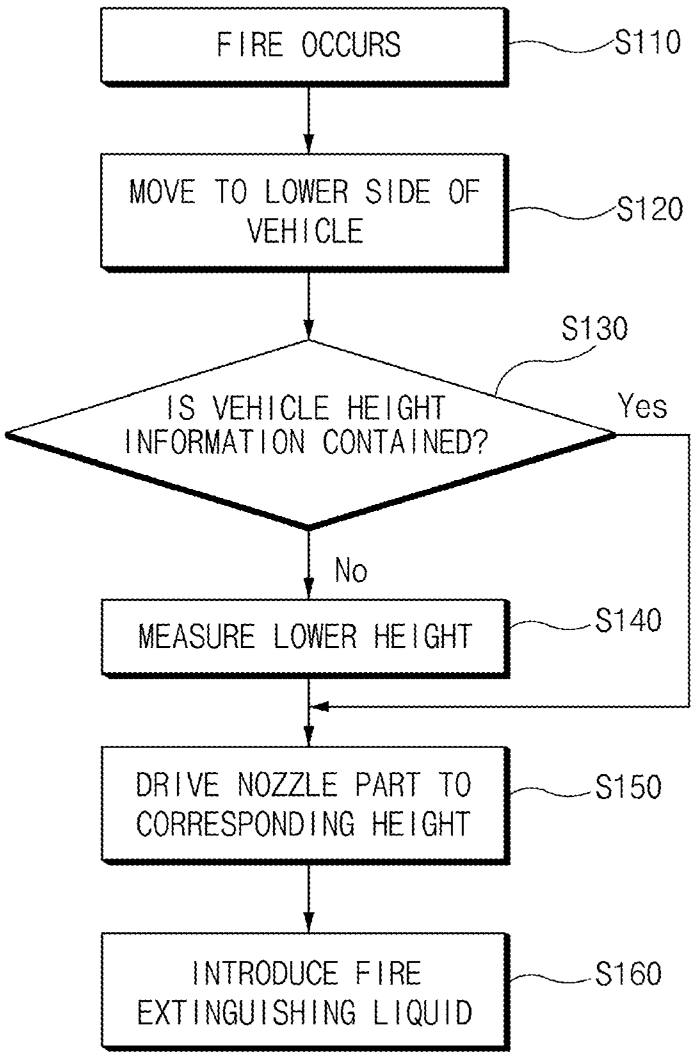
FIG. 11 is a flowchart illustrating a fire suppressing method according to an embodiment of the present disclosure.

FIG. 11 is a flowchart illustrating a fire suppressing method according to an embodiment of the present disclosure.

Hereinafter, it will be assumed that the fire suppressing apparatus of FIG. 3 performs a process of FIG. 11.

First, when a fire occurs in the battery 1110 in the electric vehicle 1100, in which the battery 1110 is disposed on a lower side of the vehicle (S110), high power of the battery 1110 is disconnected, and a notification for evacuation may be provided to a driver through an alarm or the like.

Subsequently, a fireman or a similar person may move out to move the fire suppressing apparatus 1200 to a lower side of the electric vehicle 1100, in which the fire occurs, by operating the fire suppressing apparatus 1200.

Subsequently, the controller 1270 may cause the sharp portion of the head part 1257 to pass through the lower side of the vehicle and the battery 1110 by causing the nozzle part 1255 to protrude to an upper side based on the acquired lower height of the vehicle after acquiring a lower height of the vehicle through the vehicle information DB 1210 (S130).

Subsequently, the controller 1270 may suppress the fire that occurred in the battery 1110 by performing a control such that the fire extinguishing medium to be injected into the interior of the battery 1110 through the ejection holes 1258.

Meanwhile, the controller 1270 may calculate a distance, by which the nozzle part 1255 moves to an upper side, based on the lower height of the vehicle, which is measured through the height measuring part 1230 (S140), when it cannot acquire the lower height of the vehicle through the vehicle information DB 1210 (S130).

Subsequently, the controller 1270 may cause the sharp portion of the head part 1257 to pass through the lower side of the vehicle and the battery 1110 by causing the nozzle part 1255 to protrude to the upper side based on the measured lower height of the vehicle.

Subsequently, the controller 1270 may suppress the fire that occurred in the battery 1110 by performing a control such that the fire extinguishing medium to be injected into the interior of the battery 1110 through the ejection holes 1258.

As described above, according to the present disclosure, because the fire extinguishing medium, such as a fire extinguishing chemical or a fire extinguishing liquid, may be directly introduced into cells and a battery sub-system that have a danger of a fire explosion from an outside of the vehicle when a fire occurs in the electric vehicle or in a battery system in the vehicle, the fire may be immediately suppressed.

Figure 12:
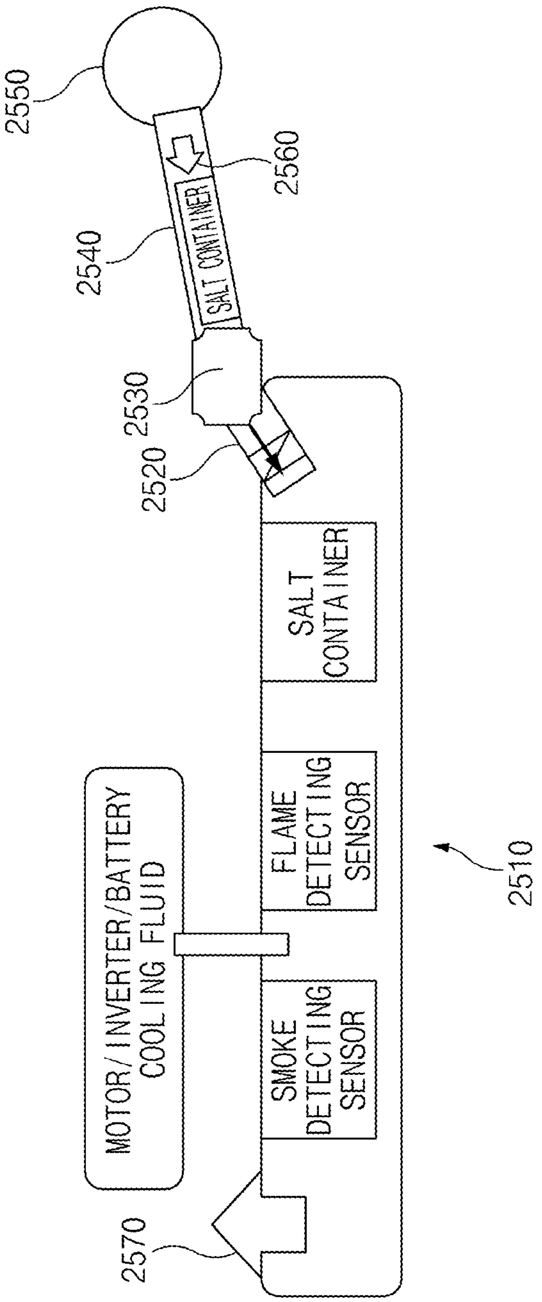
FIG. 12 is a view illustrating a battery module according to another embodiment of the present disclosure.
Figure 13:
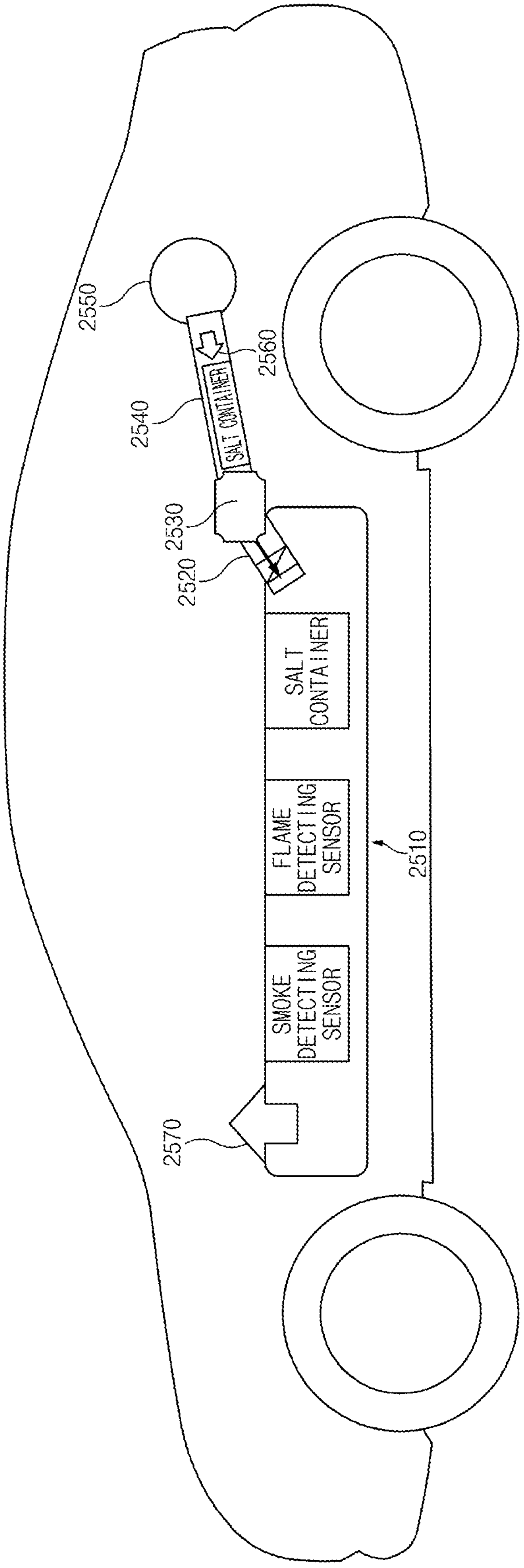
FIG. 13 is a view illustrating a state, in which a battery module is mounted on an electric vehicle, according to another embodiment of the present disclosure.

FIG. 12 is a view illustrating a battery module according to another embodiment of the present disclosure. FIG. 13 is a view illustrating a state, in which a battery module is mounted on an electric vehicle, according to another embodiment of the present disclosure.

The battery module according to the another embodiment of the present disclosure has a structure, in which a fire extinguishing liquid may be introduced from the outside of the vehicle such that the fire of the battery may be promptly suppressed when the fire occurs in the electric vehicle, and a discharge speed of the battery may be made to become faster by adding salt substances to the fire extinguishing liquid.

Referring to FIGS. 12 and 13, a battery module 510 according to the another embodiment of the present disclosure may include a smoke detecting sensor, a flame detecting sensor, and a salt container.

The smoke detecting sensor may detect smoke that is generated in the battery module 2510 by suctioning air, and the flame detecting sensor may detect flames that are generated in the battery module 2510.

A battery valve 2520, a connector member 2530, an introduction channel 2540, an opening valve 2560, and a port 2550 may be provided on one side or the battery module 2510, and a discharge valve 2570 may be provided on an opposite side of the battery module 2510.

The battery valve 2520 may be provided at an upper portion of one side of the battery module 2510, and a connector member 2530 may be connected to the battery valve 2520. The introduction channel 2540, in which the salt container is embedded, may be connected to one side of the connector member 2530, the opening valve 2560 may be provided on one side of the introduction channel 2540, and the port 2550 may be connected to one side of the opening valve 2560.

The battery valve 2520 and the opening valve 2560 may include a valve that is sealed in a normal situation that is not a fire occurring situation. Accordingly, the battery valve 2520 and the opening valve 2560 are maintained in a closed state and the introduction channel 2540 is maintained in a sealed state from an outside in a normal situation and the battery valve 2520 and the opening valve 2560 are brought into the opened states when the fire occurs in the battery module 2510 whereby the fire extinguishing water is introduced into the battery module 2510 through the introduction channel 2540. For example, the battery valve 2520 and the opening valve 2560 may include a check valve that causes a fluid to flow only one direction.

The salt container included in the battery module 2510 and the salt container included in the introduction channel 2540 may include an external container, in which salt (or a NaCl substance) and a metal or plastic container, in which a net is embedded. In particular, the salt container provided in the introduction channel 2540 may have a cross-sectional area that is 50% of a cross-sectional area of the introduction channel 2540.

The external container is fixed to the net, salt may stay in the net even when the salt is powdered due to vibration of the vehicle, and the fire extinguishing liquid may be introduced into the net such that it may flow to a lower side when it is in a solution state. For example, an amount of the salt may be 5% of a volume of the battery module 2510 and a concentration of the salt water may be 3% or more. When the fire extinguishing water is introduced into the battery module 2510 due to the fire of the battery module 2510, the salt water may be introduced into the interior of the battery module 2510 due to the salt whereby a discharge speed of the battery module 2510 may become higher.

Moreover, the introduction channel 2540, the opening valve 2560, and the port 2550 may be manufactured to be connected to the battery module 2510 in an electric vehicle manufacturing process, and the introduction channel 2540 may be manufactured to be connected to the battery valve 2520 through the connector member 2530. The introduction channel 2540 may be manufactured to be connected to the port 2550 such that the fire extinguishing liquid may be introduced from the outside. The port 2550 may be manufactured to be located on a side that is close to a rear trunk of the electric vehicle to be spaced apart from a fire occurrence location when a fire occurs in the battery module 2510. The port 2550 may be configured to be manually opened from the outside.

The discharge valve 2570 may be provided at an upper portion of an opposite side of the battery module 2510 such that the fire extinguishing liquid may stay long in the interior of the battery module 2510. The discharge valve 2570 may be a configuration for decreasing an internal pressure of the battery module 2510 by discharging a gas that is present in the interior of the battery module 2510 to the outside when a fire occurs in the battery module 2510. In this case, a danger of explosion of the battery module 2510 may be lowered, and the fire extinguishing liquid may be smoothly introduced into the interior of the battery module 2510 through the introduction channel 2540 as well. However, normally, the discharge valve 2570 may be maintained in a closed state to secure a sealing performance of the battery module 2510. For example, the discharge valve 2570 may include a check valve that may be manipulated such that an internal pressure thereof is solved and the fire extinguishing liquid is easily introduced into an interior thereof when the fire extinguishing liquid is introduced from an outside or the battery module 2510.

For reference, the battery valve 2520, the opening valve 2560, and the discharge valve 2570 may be operated by a battery of 12 V even when the high power of the battery of the electric vehicle is interrupted.

When a fire occurs in the battery module 2510 of the electric vehicle, an alarm according to occurrence of the fire may be generated when smoke is detected by a smoke detector. The alarm may be made through an acoustic means or a visual means (for example, a lamp or a display). Subsequently, when flames are detected by a flame detector, the high power of the battery of the electric vehicle may be controlled to be interrupted.

Subsequently, a separate motor/inverter/battery cooling fluid in the interior of the vehicle may be introduced into the battery module 2510, the discharge valve 2570 may be opened, and the fire extinguishing liquid may be introduced from the outside of the electric vehicle through the port 2550.

In this way, when a fire occurs in the electric vehicle or the battery module of the vehicle, the fire extinguishing liquid may be directly introduced into the battery module having a danger of a fire explosion whereby the fire may be extinguished.

Moreover, the fire truck moves out and a general fire extinguishing liquid is introduced into the vehicle having a fire by using general water of the fire plug or the fire truck when the fire occurs in the electric vehicle, salt (NaCl) installed in the interior of the vehicle is automatically added and the salt water is introduced into the interior of the battery module whereby a fire extinguishing time may be shortened by increasing a discharge speed of the battery module 2510.

As described above, The battery module according to the another embodiment of the present disclosure has a structure, in which a fire extinguishing liquid may be introduced from the outside of the vehicle such that the fire of the battery may be promptly suppressed when the fire occurs in the electric vehicle, and a discharge speed of the battery may be made to become faster by adding salt substances to the fire extinguishing liquid whereby a safety of the electric vehicle may be enhanced by promptly extinguishing the fire when the fire occurs in the electric vehicle.

Moreover, various embodiments of the present disclosure may be implemented by software (e.g., a program) including one or more instructions stored in a storage medium (e.g., an internal memory or an external memory) that may be read by a machine. For example, a device may call, among one or more instructions stored in a storage medium, at least one instruction, and may execute the instruction. This allows at least one function to be performed according to the called at least one instruction. The one or more instructions may include a code that is made by a compiler or a code that may be executed by an interpreter.

The storage medium that may be read by a device may be provided in a form of a non-transitory storage medium. Here, the 'non-transitory storage medium' means that the storage medium is a tangible device and does not include a signal (e.g., an electromagnetic wave), and with regard to the tam, a case, in which data are semi-permanently stored in the storage medium, and a case, in which data are temporarily stored in the storage medium, are not distinguished.

According to an embodiment, the methods according to various embodiments of the present disclosure may be provided to be included in a computer program product. The computer program product may be traded between a seller and a purchaser. The computer program product may be distributed in a form of a storage medium that may be read by a device (e.g., a compact disk read only memory (CD-ROM) or may be distributed (e.g., downloaded or uploaded) through an application store or directly or online between two user devices. In the online distribution, at least a portion of the computer program product may be at least temporarily stored in a storage medium, such as a server of a manufacturer, a server of an application store, or a memory of a relay server, which may be read by a device, or temporarily generated.

According to various embodiments, components (e.g., modules or programs) of the above-described components may include one or a plurality of entities, and some of the plurality of entities may be disposed to be separated from the other components.

According to various embodiments, among the above-described components, one or more components or operations may be omitted or one or more other components or operations may be added.

Alternatively or additionally, the plurality of components (e.g., modules or programs) may be integrated into one component. In this case, the integrated components may perform one or more functions of the plurality of components in a way that is the same as or similar to that performed by the corresponding ones of the plurality of components before the integration.

According to various embodiments, the operations performed by modules, programs, or other components may be executed sequentially, in parallel, repeatedly, or heuristically, one or more operations may be executed in another sequence or omitted, or one or more other operations may be added.

As described above, according to the present disclosure, when a battery related fire occurs in the electric vehicle, the fire extinguishing chemical or the fire extinguishing liquid may be introduced into the interior of the battery from the outside of the vehicle to promptly suppress the fire of the battery whereby the fire may be immediately suppressed.

Vehicle Control Apparatus and Vehicle Control Method

Figure 14:
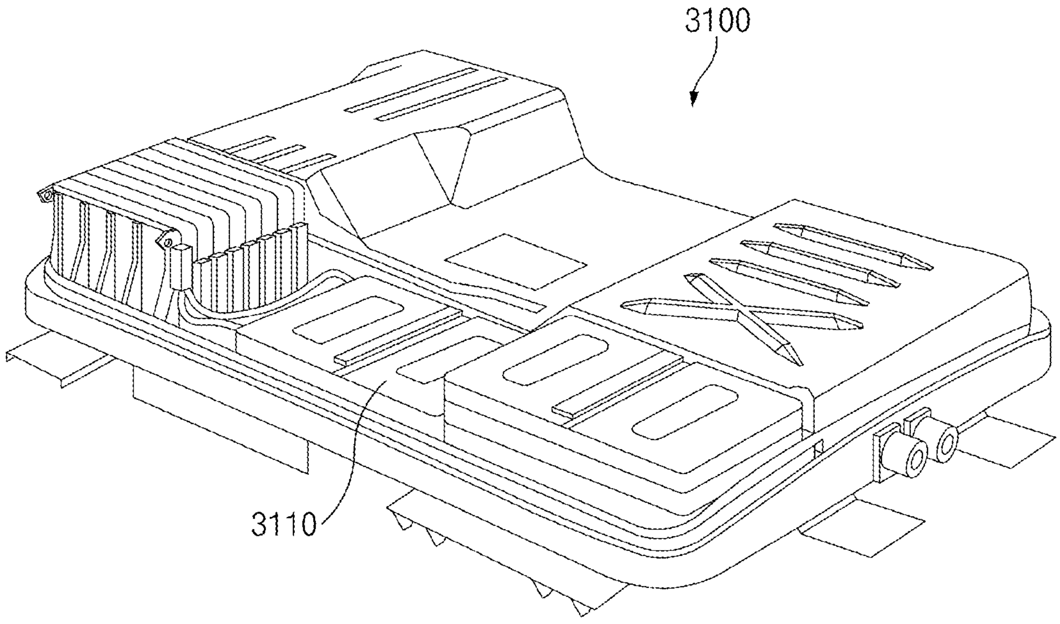
FIG. 14 is a view illustrating a battery module that constitutes a vehicle control apparatus according to an embodiment of the present disclosure.
Figure 15:
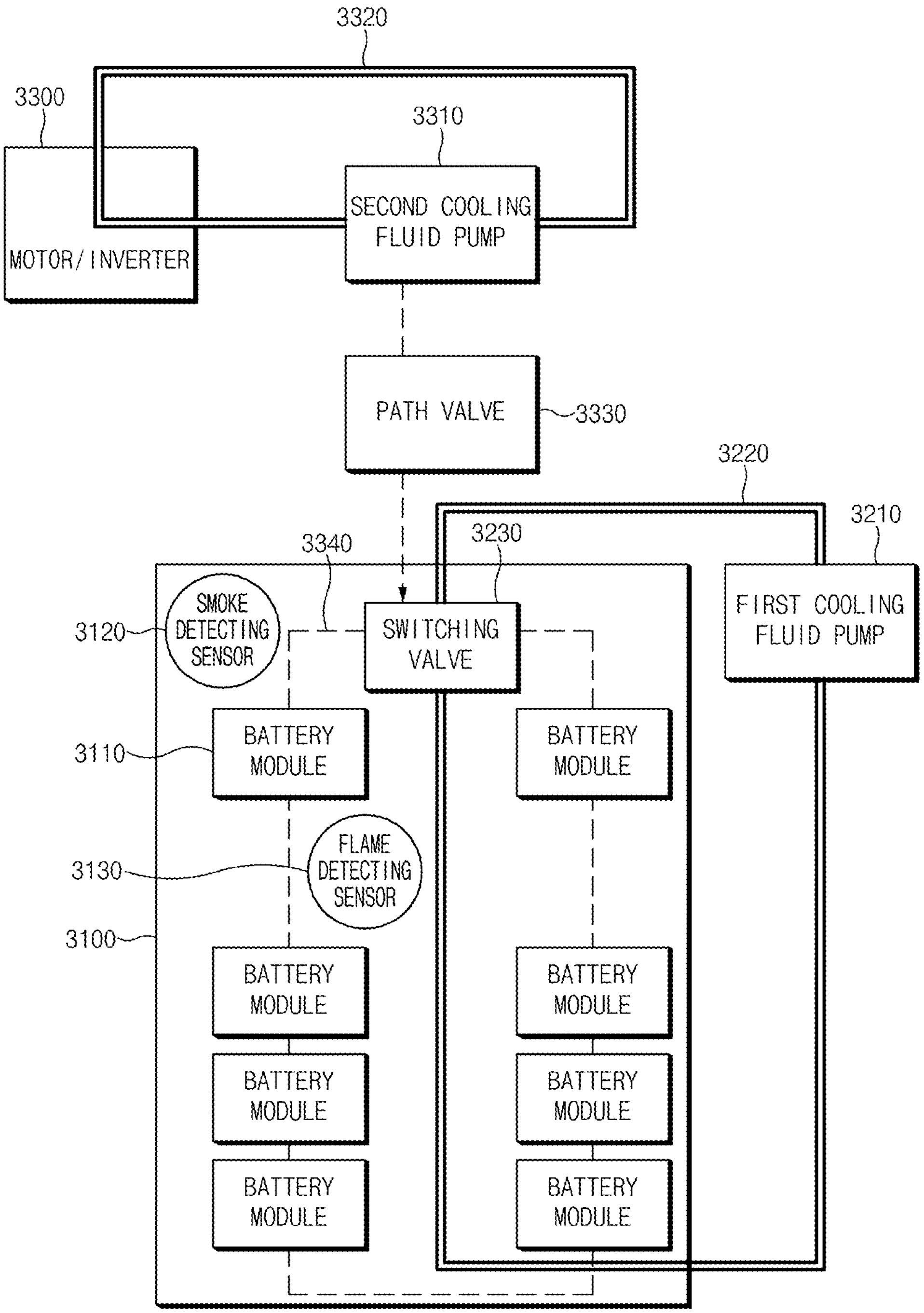
FIGS. 15 and 16 are views illustrating a vehicle control apparatus according to an embodiment of the present disclosure.
Figure 16:
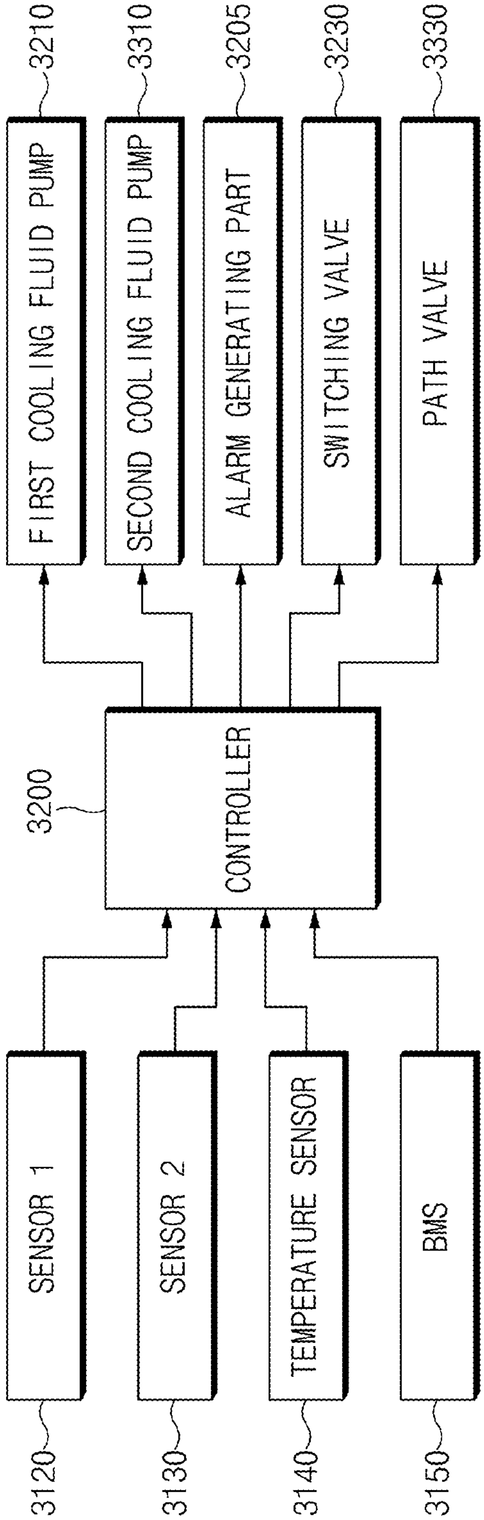

FIG. 14 is a view illustrating a battery module that constitutes a vehicle control apparatus according to an embodiment of the present disclosure. FIGS. 15 and 16 are views illustrating the vehicle control apparatus according to an embodiment of the present disclosure.

Referring to FIGS. 14 and 16, the vehicle using an electric motor according to an embodiment of the present disclosure may be an electric vehicle that is driven by the electric motor. Furthermore, a high-voltage battery module 3100 that provides driving power may be mounted on the vehicle. The battery module 3100 may include a plurality of battery modules 3110 that are mounted in a battery case.

The vehicle control apparatus according to an embodiment of the present disclosure is adapted to suppress the fire that occurs in the battery module 3100 at an initial stage, and may include a smoke detecting sensor 3120 that detects smoke that is generated in the battery module 3100, a flame detecting sensor 3130 that detects flames that are generated in the battery module 3100, a temperature sensor 3140 that detects a temperature of the battery module 3110, and a controller 3200.

The temperature sensor 3140 may be attached to a battery case that surrounds the battery module 3110.

The controller 3200 may be electrically connected to the smoke detecting sensor 3120 to receive a signal of the smoke detecting sensor 3120, and may determine whether smoke is generated in the battery module 3100. The controller 3200 may be electrically connected to the flame detecting sensor 3130 to receive a signal of the flame detecting sensor 3130, and may determine whether flames are generated in the battery module 3100. The controller 3200 may be electrically connected to the temperature sensor 3140 to receive a signal of the temperature sensor 3140, and may determine a temperature of the battery module 3110. For example, the controller 3200 may include an electric vehicle controller (EVC), a micro controller unit (MCU), or a battery management system (BMS) 3150.

The vehicle control apparatus according to an embodiment of the present disclosure may include a first cooling circulation passage 3220, a second cooling circulation passage 3320, and a third cooling circulation passage 3340.

A first cooling fluid that cools the battery module 3100 may circulate in the first cooling circulation passage 3220, and the first cooling fluid may circulate through driving by a first cooling fluid pump 3210.

A second cooling fluid that cools the motor/inverter 3300 may circulate in the second cooling circulation passage 3320, and the second cooling fluid may circulate through driving by a second cooling fluid pump 3310.

A third cooling circulation passage 3340 may be provided in the interior of the battery module 3100, and may be configured such that the cooling fluid circulates through the battery case that surrounds the battery module 3110. The third cooling circulation passage 3340 may supply the cooling fluid to the battery module 3110 to suppress the fire when the fire occurs in the battery module 3100.

A circulation passage that connects the first cooling circulation passage 3220 and the third cooling circulation passage 3340 may be further included, and a switching valve 3230 that switches flows of the first cooling fluid such that the first cooling fluid flows in the third cooling circulation passage 3340 may be provided between the first cooling circulation passage 3220 and the third cooling circulation passage 3340.

A circulation passage that connects the second cooling circulation passage 3320 and the third cooling circulation passage 3340 may be further included, and a path valve 3330 that switches flows of the second cooling fluid such that the second cooling fluid flows in the third cooling circulation passage 3340 may be provided between the second cooling circulation passage 3320 and the third cooling circulation passage 3340. For example, the switching valve 3230 and the path valve 3330 may be a 3-way valve.

The controller 3200 may drive the first cooling fluid pump 3210 such that the first cooling fluid circulates in the first cooling circulation passage 3220 whereby the battery module 3100 is cooled, and may drive the second cooling fluid pump 3310 such that the second cooling fluid circulates in the second cooling circulation passage 3320 whereby the motor/inverter 3300 is cooled.

The controller 3200 may generate an alarm with the alarm generating part 3205 when the fire in the interior of the battery module 3100 is detected by the smoke detecting sensor 3120, the flame detecting sensor 3130, or the temperature sensor 3140. For example, the alarm generating part 3205 may include an acoustic means or a visual means. Then, the driver of the vehicle may evacuate through generation of the alarm.

The controller 3200 may suppress the fire of the battery module 3100 by stopping the supply of the first cooling fluid to the first cooling circulation passage 3220 and driving the switching valve 3230 such that the first cooling fluid that circulates in the first cooling circulation passage 3220 circulates in the third cooling circulation passage 3340 to introduce the cooling fluid into the battery module 3110 when it is determined that the fire occurs.

The controller 3200 may suppress the fire of the battery module 3100 by stopping the supply of the second cooling fluid to the second cooling fluid passage 3320 and driving the path valve 3330 such that the second cooling circulation that circulates in the second cooling circulation passage 3320 circulates in the third cooling circulation passage 3340 to additionally introduce the cooling fluid to the battery module 3110 when the fire of the battery module 3100 cannot be suppressed by the first cooling fluid.

Meanwhile, a battery valve (not illustrated) may be provide in the battery case, through which the third cooling circulation passage 3340 passes. Accordingly, when the battery valve is in a closed state and the battery case is maintained in a closed state in a normal state and a fire occurs in the battery module 3100, the battery valve is opened whereby the cooling fluid may be introduced into the battery module 3110 through the third cooling circulation passage 3340.

Moreover, the controller 3200 may control at least another component (e.g., a hardware or software component) of the vehicle control apparatus, and may perform various data processing or calculations. According to an embodiment, as at least a part of data processing or calculations, the controller 3200 may store a command or data received from another element (e.g., a sensor) in a volatile memory, may process the command or data stored in the volatile memory, and may store result data in the nonvolatile memory.

According to an embodiment, the controller 3200 may include a main processor (e.g., a central processing device or an application processor), and an auxiliary processor (e.g., a graphic processing device, an image signal processor, a sensor hub processor, or a communication processor) which may be operated independently from or together with the main processor. For example, when the controller 3200 includes a main processor and an auxiliary processor, the auxiliary processor may be set to use lower electric power than the main processor or to be specified to a specific function. The auxiliary processor may be implemented separately from the main processor or as a part thereof.

In addition, although not illustrated in the drawings, according to the embodiments, the vehicle control apparatus may include a storage. The storage may store instructions that control the vehicle control apparatus, control instruction codes, control data, or user data. For example, the storage may include at least one of an application program, an operating system (OS), middleware, or a device driver.

The storage may include one or more of a volatile memory or a nonvolatile memory. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), and a ferroelectric RAM (FeRAM). The nonvolatile memory may include a read only memory (ROM), a programmable ROM (PROM), an electrically programmable ROM (EPROM), an electrically erasable programmable ROM (EEPROM), and a flash memory.

The storage may further include a nonvolatile medium, such as a hard disk drive (HDD), a solid state disk (SSD), an embedded multimedia card (eMMC), and a universal flash storage (UFS).

Hereinafter, a vehicle control method according to another embodiment of the present disclosure will be described in detail with reference to FIG. 17.

Figure 17:
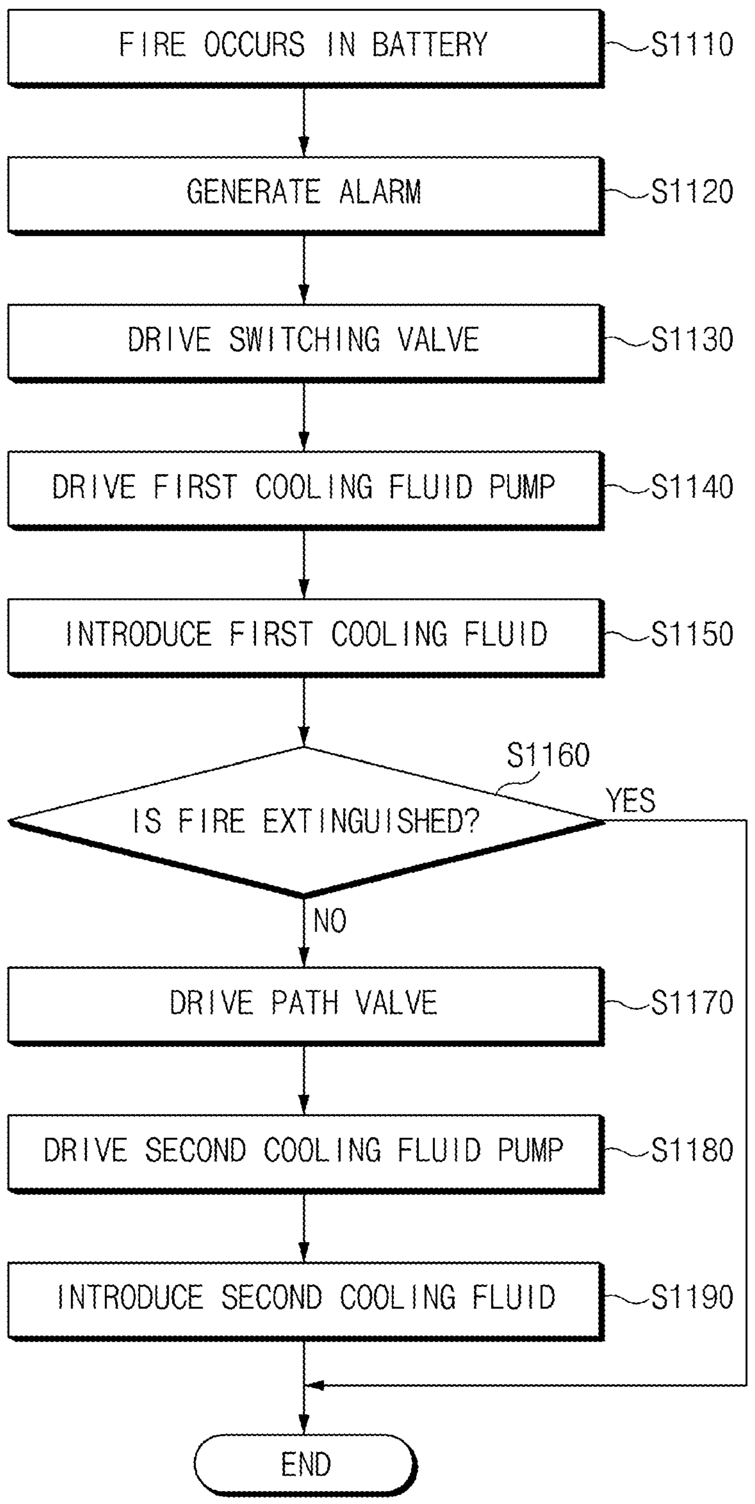
FIG. 17 is a flowchart illustrating a vehicle control method according to an embodiment of the present disclosure.

FIG. 17 is a flowchart illustrating a vehicle control method according to an embodiment of the present disclosure.

Hereinafter, it will be assumed that the vehicle control apparatus of FIG. 16 performs a process of FIG. 17.

First, the controller 3200 may drive the first cooling fluid pump 3210 such that the first cooling fluid circulates in the first cooling circulation passage 3220 whereby the battery module 3100 is cooled, and may drive the second cooling fluid pump 3310 such that the second cooling fluid circulates in the second cooling circulation passage 3320 whereby the motor/inverter 3300 is cooled.

Subsequently, the controller 3200 may generate an alarm with the alarm generating part 3205 (S1120) when the fire in the interior of the battery module 3100 is detected by the smoke detecting sensor 3120, the flame detecting sensor 3130, or the temperature sensor 3140 (S1110).

The controller 3200 may suppress the fire of the battery module (S1160) by stopping the supply of the first cooling fluid to the first cooling circulation passage 3220 and driving the switching valve 3230 (S1130) such that the first cooling fluid that circulates in the first cooling circulation passage 3220 circulates in the third cooling circulation passage 3340 (S1140) to introduce the cooling fluid into the battery module 3110 (S1150).

Meanwhile, the controller 3200 may suppress the fire of the battery module 3100 (S1190) by stopping the supply of the second cooling fluid to the second cooling circulation passage 3320 and driving the path valve 3330 (S1170) such that the second cooling fluid that circulates in the second cooling circulation passage 3320 circulates in the third cooling circulation passage 3340 (S1180) to additionally introduce the cooling fluid to the battery module 3110 when the fire of the battery module 3100 cannot be suppressed by the first cooling fluid (S1160).

As described above, according to the present disclosure, the fire that occurred in the battery module may be suppressed by the cooling fluid at an initial stage whereby burning-down of the vehicle may be prevented and further damage of human lives may be prevented. In addition, because an owner of the vehicle may replace only the damaged battery with a new one, repair costs may be significantly reduced as compared with a situation, in which the vehicle is damaged by a fire.

According to the present disclosure, safety of an electric vehicle may be enhanced by promptly extinguishing a fire when the fire occurs in an electric vehicle due to a battery.

Although it is apparent that the present disclosure has been described with reference to the limited embodiments and the drawings, the present disclosure is not limited thereto, and the present disclosure may be variously carried out by an ordinary person in the art within the technical spirit of the present disclosure and the equivalent ranges of the claims.

What is claimed is:

1. A vehicle control apparatus comprising:

a switching valve provided between a first cooling circulation passage and a third cooling circulation passage passing via a battery and provided in an interior of a battery case including the battery;

a path valve provided between a second cooling circulation passage and the third cooling circulation passage;

a first cooling fluid pump configured to supply the first cooling fluid;

a second cooling fluid pump configured to supply the second cooling fluid; and a controller electrically connected to the first cooling fluid pump, the second cooling fluid pump, the switching valve, and the path valve, the controller configured to drive the first cooling fluid pump to supply the first cooling fluid to the first cooling circulation passage to cool a battery module and drive the second cooling fluid pump to supply the second cooling fluid to the second cooling circulation passage, in response to a detection of fire, the controller further configured to drive the switching valve to switch a flow of the first cooling fluid from the first cooling circulation passage to the third cooling circulation passage and selectively drive the path value to switch a flow of the second cooling fluid from the second cooling circulation passage to the third cooling circulation passage.

2. The vehicle control apparatus of claim 1, wherein in response to a detection that the fire exists, the controller is configured to drive the path valve to additionally suppress the fire.

3. The vehicle control apparatus of claim 1, wherein the controller drives the switching valve to stop supply of the first cooling fluid to the first cooling circulation passage prior to supplying the first cooling fluid to the third cooling circulation passage.

4. The vehicle control apparatus of claim 3, wherein the controller drives the path valve to stop supply of the second cooling fluid to the second cooling circulation passage prior to supplying the second cooling fluid to the third cooling circulation passage when the fire of the battery continues after the first cooling fluid is supplied to the third cooling circulation passage.

5. The vehicle control apparatus of claim 2, wherein the one or more sensors including a smoke sensor, a flame sensor, and a temperature sensor that detect the fire condition and communicate with the controller.

6. The vehicle control apparatus of claim 2, wherein the controller is further configured to generate an alarm based on the fire condition.

7. The vehicle control apparatus of claim 1, wherein the switching valve and the path valve are three-way valves.

* * * * *